(12) United States Patent
Jones et al.

(10) Patent No.: US 11,092,452 B2
(45) Date of Patent: Aug. 17, 2021

(54) COGNITVE ANALYSIS OF VEHICLE ROUTES FOR MANUAL OR AUTONOMOUS VEHICLES

(71) Applicant: INTERNATIONAL BUSINESS MACHINES CORPORATION, Armonk, NY (US)

(72) Inventors: Andrew R. Jones, Round Rock, TX (US); Christian Compton, Austin, TX (US); Gregory J. Boss, Saginaw, MI (US); Jeremy R. Fox, Georgetown, TX (US); John E. Moore, Jr., Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/240,261

(22) Filed: Jan. 4, 2019

(65) Prior Publication Data
US 2020/0217678 A1    Jul. 9, 2020

(51) Int. Cl.
*G01C 21/34* (2006.01)
*B60W 40/09* (2012.01)

(52) U.S. Cl.
CPC ......... *G01C 21/3461* (2013.01); *B60W 40/09* (2013.01); *G01C 21/3492* (2013.01)

(58) Field of Classification Search
CPC ............ G01C 21/3461; G01C 21/3492; G01C 21/20; G01C 21/3415; B60W 40/09; G05D 1/0223; G05D 1/0214
See application file for complete search history.

(56) References Cited

U.S. PATENT DOCUMENTS 8,612,139 B2 * 12/2013 Wang ............... G08G 1/096775
                                                        701/410
9,566,986 B1 * 2/2017 Gordon ................. B60W 50/12
(Continued)

FOREIGN PATENT DOCUMENTS

CN        107578482 B  * 11/2019  ............. G07B 15/06

OTHER PUBLICATIONS

English Translation of CN107578482B.*
(Continued)

*Primary Examiner* — Rami Khatib
*Assistant Examiner* — Gabriel J Lambert
(74) *Attorney, Agent, or Firm* — Tutunjian & Bitetto. P.C.; Michael Petrocelli

(57) ABSTRACT

A computer implemented navigation method that provides a safest route by considering manual driver risk. The method may include providing at least two sets of directions from a user start location to a final user location based on a user navigation system and user permission for data access; and ranking said at least two sets of directions by a baseline safety value. The method may also include determining in real time travelers that are present on passageways for the at least two sets of directions; and ranking the travelers according to travel risk behavior. Finally, the method may assign an aggregate risk score to each passageway for the at least two sets of directions for each passageway specific grouping of the travels having the ranked travel risk behavior to provide a safety ranked set of the at least two sets directions to the final user location.

18 Claims, 6 Drawing Sheets

(56) References Cited

U.S. PATENT DOCUMENTS

| | | | |
|---|---|---|---|
| 9,574,888 B1* | 2/2017 | Hu | G01C 21/3461 |
| 10,699,347 B1* | 6/2020 | Slusar | G06Q 40/08 |
| 2009/0210142 A1 | 8/2009 | Couckuyt et al. | |
| 2010/0036599 A1* | 2/2010 | Froeberg | G01C 21/3461 |
| | | | 701/532 |
| 2010/0082226 A1* | 4/2010 | Mukherjee | G08G 1/0104 |
| | | | 701/118 |
| 2012/0303262 A1* | 11/2012 | Alam | G01C 21/3667 |
| | | | 701/410 |
| 2013/0115972 A1* | 5/2013 | Ziskind | H04W 4/21 |
| | | | 455/456.2 |
| 2013/0338914 A1* | 12/2013 | Weiss | G08G 1/0112 |
| | | | 701/465 |
| 2014/0279009 A1* | 9/2014 | Grigg | G06Q 30/0261 |
| | | | 705/14.58 |
| 2016/0042650 A1* | 2/2016 | Stenneth | G09B 5/00 |
| | | | 701/23 |
| 2016/0171521 A1* | 6/2016 | Ramirez | G06Q 10/0635 |
| | | | 701/409 |
| 2017/0106876 A1 | 4/2017 | Gordon et al. | |
| 2017/0234689 A1 | 8/2017 | Gibson et al. | |
| 2017/0236411 A1* | 8/2017 | Sumers | G08G 1/0133 |
| | | | 701/117 |
| 2017/0336213 A1 | 11/2017 | Fowe et al. | |
| 2018/0144636 A1* | 5/2018 | Becker | B60W 30/00 |
| 2018/0374113 A1* | 12/2018 | Ramirez | G08G 1/096816 |
| 2019/0390963 A1* | 12/2019 | Kumar | G01C 21/3667 |

OTHER PUBLICATIONS

Merat, N. et al., "Transition to manual: Driver behaviour when resuming control from a highly automated vehicle" Transportation Research Part F (Oct. 2014) pp. 274-282, vol. 27.

Disclosed Anonymously, "Method and System for Determining Safest Co-Location Routing Based on the Manufacturers of Autonomous Vehicles" Ip.com No. IPCOM000253887D (May 2018) pp. 1-4.

Corporate Partnership Board Report, "Automated and Autonomous Driving: Regulation under uncertainty" OECD https://cyberlaw.stanford.edu/files/publication/files/15CPB_AutonomousDriving.pdf (2015) pp. 1-32.

Turpen, A., "Switch from autonomous driving to manual control opens window of risk" http://newatlas.com/stanford-autonomous-driving-manual-transition-danger/46832/ (Dec. 2016) pp. 1-6.

* cited by examiner

COGNITVE ANALYSIS OF VEHICLE ROUTES FOR MANUAL OR AUTONOMOUS VEHICLES

BACKGROUND

Technical Field

The present invention relates generally to motor vehicles and, more particularly, to determining a safest route of passage for autonomous vehicles.

Description of the Related Art

Autonomous vehicles are growing in popularity and may become the majority of vehicles on the road at some point in the future. Currently, we live in an automotive population of cars that is mixed with fully autonomous, semi-autonomous, and fully manually driven vehicles. In an environment having so many vehicles on the road, driver safety is an increasing concern. Drivers would like to know a safest route to use their vehicles.

SUMMARY

According to aspects of the present disclosure, a system, method, and computer program product is provided to determine the safest vehicle navigational route for manual or autonomous mode driving by using cognitive analysis of other manual mode drivers on the potential routes for navigation.

In one embodiment, a computer implemented navigation method is provided that calculates a safest navigation route by considering manual driver risk. In one embodiment, the method can begin with providing at least two sets of directions from a user start location to a final user location; and ranking the at least two sets of directions by a baseline safety value. In a following step, the method can further include determining in real time travelers that are present on passageways for the at least two sets of directions; and ranking the travelers according to travel risk behavior. An aggregate risk score is assigned to each passageway for the at least two sets of directions for each passageway specific grouping of the travels having the ranked travel risk behavior to provide a safety ranked set of the at least two sets directions to the final user location; and a safety ranked set of the at least two sets directions is delivered to the user.

In another aspect, a system is provided that calculates a safest navigation route by considering manual driver risk. In one embodiment, the system includes a route rank scorer that sets a baseline safety value for each of the at least two sets of directions of travel that have been calculated by a GPS system. The system may further include a traveler tracker that records an identity for travelers that are present on passageways for the at least two sets of directions; and a traveler ranking scorer that sets a score for each of the travelers according to travel risk behavior. In some embodiments, the system further includes an aggregate risk scorer for assigning an aggregate risk score to each passageway for the at least two sets of directions for each passageway specific grouping of the travels having the ranked travel risk behavior to provide a safety ranked set of the at least two sets directions to the final user location. The system can also include a transmitter for delivering the safety ranked set of the at least two sets directions to the user.

In another aspect, the present disclosure provides a computer program product including a non-transitory computer readable storage medium having computer readable program code embodied therein for a method of calculating a safest navigation route by considering manual driver risk on the potential navigation routes. The method actuated by the computer program product may include providing at least two sets of directions from a user start location to a final user location; and ranking the at least two sets of directions by a baseline safety value. In a following step, the method can further include determining in real time travelers that are present on passageways for the at least two sets of directions; and ranking the travelers according to travel risk behavior. An aggregate risk score is assigned to each passageway for the at least two sets of directions for each passageway specific grouping of the travels having the ranked travel risk behavior to provide a safety ranked set of the at least two sets directions to the final user location; and a safety ranked set of the at least two sets directions is delivered to the user.

These and other features and advantages will become apparent from the following detailed description of illustrative embodiments thereof, which is to be read in connection with the accompanying drawings.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention relates generally to autonomous vehicles and, more particularly, to a method to determine the safest vehicle navigational route for manual or autonomous mode driving by cognitive analysis of other manual mode drivers. According to aspects of the invention, a system, method, and computer program product to determine the safest vehicle navigational route for manual or autonomous mode driving by using cognitive analysis of other manual mode driver on the potential routes derived dynamically in real time. Implementations of the invention determine the optimal time and minimal risk for a driver to assume driving of a vehicle in order to maintain the safest experience possible based upon the risk levels of other manual drivers on the potential routes that the autonomous vehicle can travel.

The methods, systems, and computer program products of the present disclosure focus on the scenario where a driver want a system to derive a safest route to a destination. The driver, which may be using an autonomous vehicle, will need to calculate the current manual drivers on the road and conduct an analysis to interpret and derive the safest route based on risk levels from the manual drives on the potential routes in real time. The methods systems and computer program products described herein, will be able to select the safest navigational route for the driver to operate the manual mode based on the potential routes available from the current location of the vehicle to the selected destination based each of the routes current accumulate manual driver count and identified risk specification thereof.

As will be discussed herein, the disclosure provides a method to gather risk factors along multiple potential routes. The method can determine a risk factor for each potential route (based upon a risk assessment of manual drivers on the potential routes). In some embodiments, the methods described herein can identify the safest route against the other potential route options. In some embodiments, the methods also include an option to communicate a selected route, e.g., safest route, to the manual drier for manual vehicle operation, or to program the updated route for autonomous driving. The methods, systems and computer program products described herein also provide the ability to dynamically change the route of navigation at any time based on the cognitive recalculations of aggregated manual drivers on the road/current route, in scope. The methods, systems and computer program products are now described in further detail with reference to FIGS. 1-6.

Figure 1:
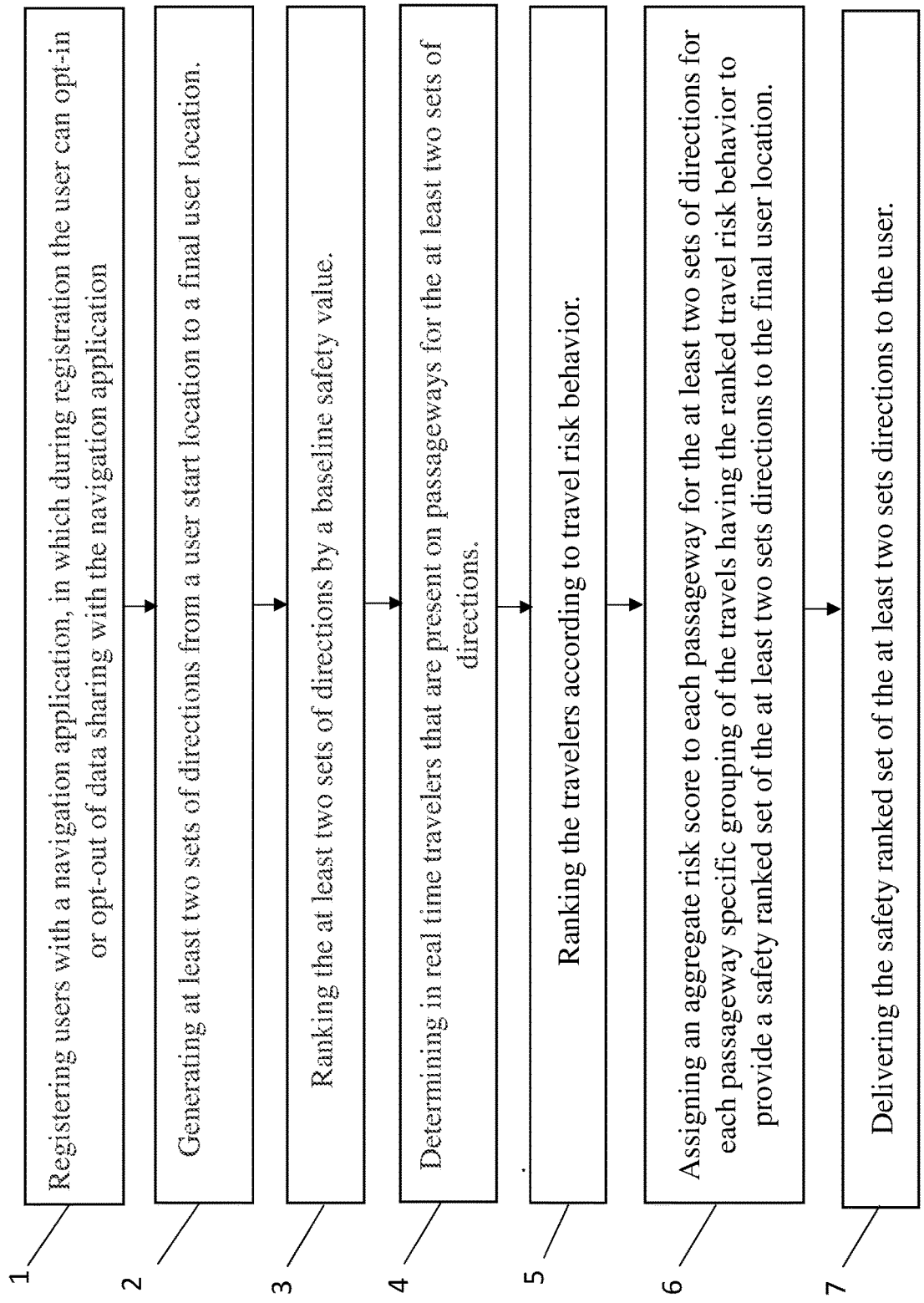
FIG. 1 depicts a block/flowchart of an exemplary navigation method that calculates a safest navigation route by considering manual driver risk, in accordance with one embodiment of the present disclosure.

FIG. 1 depicts a block/flowchart of an exemplary navigation method that calculates a safest navigation route by considering manual driver risk, in accordance with one embodiment of the present disclosure. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
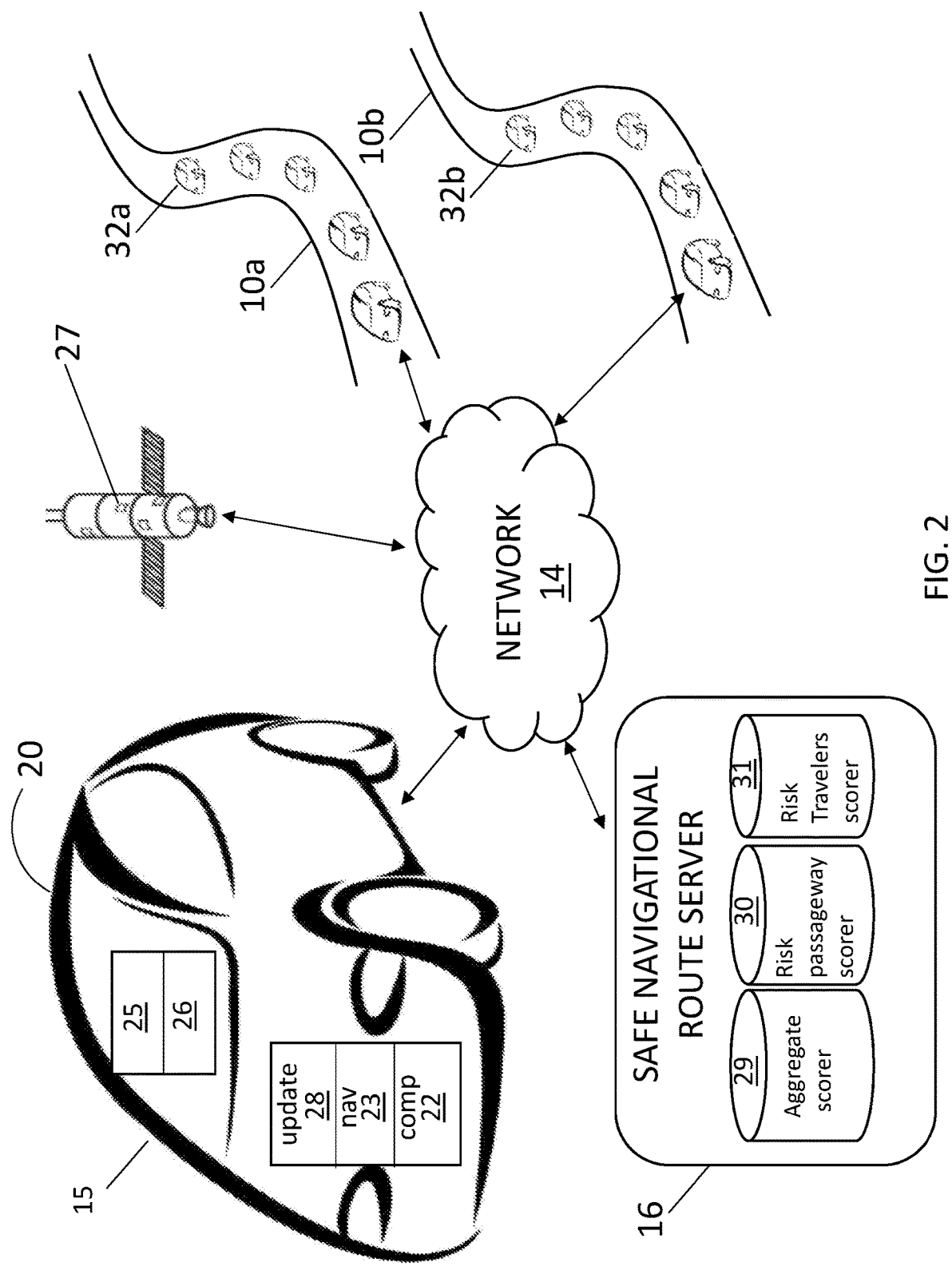
FIG. 2 depicts is an illustration of an exemplary environment in accordance with one embodiment of the present disclosure.

Referring to FIG. 1, in some embodiments the method that calculates a safest navigation route by considering manual driver risk can begin at block 1, which includes calculating at least two sets of directions 10a, 10b from a user 20 start location to a final user location. FIG. 2 depicts is an illustration of an exemplary environment in which the method that is described in FIG. 1 may be performed. In embodiments, the environment includes a vehicle 15 for the user 20, a satellite 27, a safest navigational route server 16, and a network 14.

According to aspects of the present disclosure, the vehicle 15 is a motor vehicle (e.g., car, truck, etc.) that is capable of being operated in (and selectively switched between) an autonomous driving mode and a manual driving mode. In the autonomous driving mode, a computer 22 of the vehicle 15 controls the driving movement of the vehicle 15. In the manual driving mode, a user 20 (e.g., a human driver) controls the driving movement of the vehicle 15.

Although the computer 22 is depicted entirely within the vehicle 15, embodiments have been contemplated, in which at least one or more components of the computer 22 is present within the safest navigational router server 16. The computer 22 is configured to communicate with the safest navigational route server 16 via the network 14. The network 215 comprises a communication network such as a LAN, WAN, or the Internet, or a combination of such communication networks. At least a portion of the communication between the computer 22 and the server 16 communicates by wireless communication.

The vehicle 15 also includes a display 25. In embodiments, the computer 22 comprises a navigation module 23 that causes the display 25 to display a user interface (UI) 26 that provides vehicle navigation functionality to the driver of the vehicle, e.g., user 20. In embodiments, the display 25 includes a touch-screen display by which a user may provide input to the computer 22 by physically touching a surface of the display 25. In implementations, the navigation functionality provided by the navigation module 23 and the UI 26 includes, but is not limited to, displaying a road map, showing a current location of the vehicle 15 on the road map, displaying a driving route on the road map, and making real time updates to the displayed map and driving route based on the determined location of the vehicle 15.

The navigation module 23 determines the current location of the vehicle 15 using location system data, such as global positioning system (GPS) data. The navigation module 23 determines the current speed of the vehicle 205 from sensor data of the vehicle 205. The navigation module 222 determines the driving route based on input provided by the user (e.g., driver) of the vehicle 205 and using route determining programming.

It is noted that the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

Referring to block 1 of FIG. 1, the method can begin with users registering with a navigation application. User registration not only includes providing the user access to a navigation application in accordance with the methods disclosed herein, but also includes the users giving permission or not giving permission for the navigation application to access the users data, e.g., personal data. Aspects of the methods disclosed herein provide for data sharing. For example, data sharing can be used to provide the virtual maps. Users having the option of participating in this aspect, e.g., opting-in, or not participating, e.g., opting-out. To the extent implementations of the invention collect, store, or employ personal information provided by, or obtained from, individuals (for example, current locations of drivers, historical records of drivers, etc.), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information. Further, the user may change their data sharing status, e.g., whether they opt-in to the system or opt-out of the system, at any time.

Referring back to block 2 of FIG. 1, the navigation method can begin with calculating at least two sets of directions 10a, 10b from a user 20 start location to a final user location. This can include the user 20 logging into a navigation application of the navigation module 23 of the on board computer 22 of the vehicle. The navigation application may include a registration step for collecting user information that can be stored in the safe navigational route server 16. This user information may be used by the safe navigation route server 16 to rank drivers using the system for navigation, in which an entire pool of users may be using the system and populating the roadways.

The navigation module 23, which can be provided by a global positioning system (GPS) navigation unit, maps and/or routes at least two potential routes 10a, 10b for navigation. Although FIG. 2 only depicts two routes 10a, 10b, the present disclosure is not limited to only this example. The navigation module 23 may employ any multiple of routes for providing directions between a start point and an end point of a navigation session. The multiple routes calculated by the navigation module 23 may be an input to the safe navigation route server 16.

Figure 3:
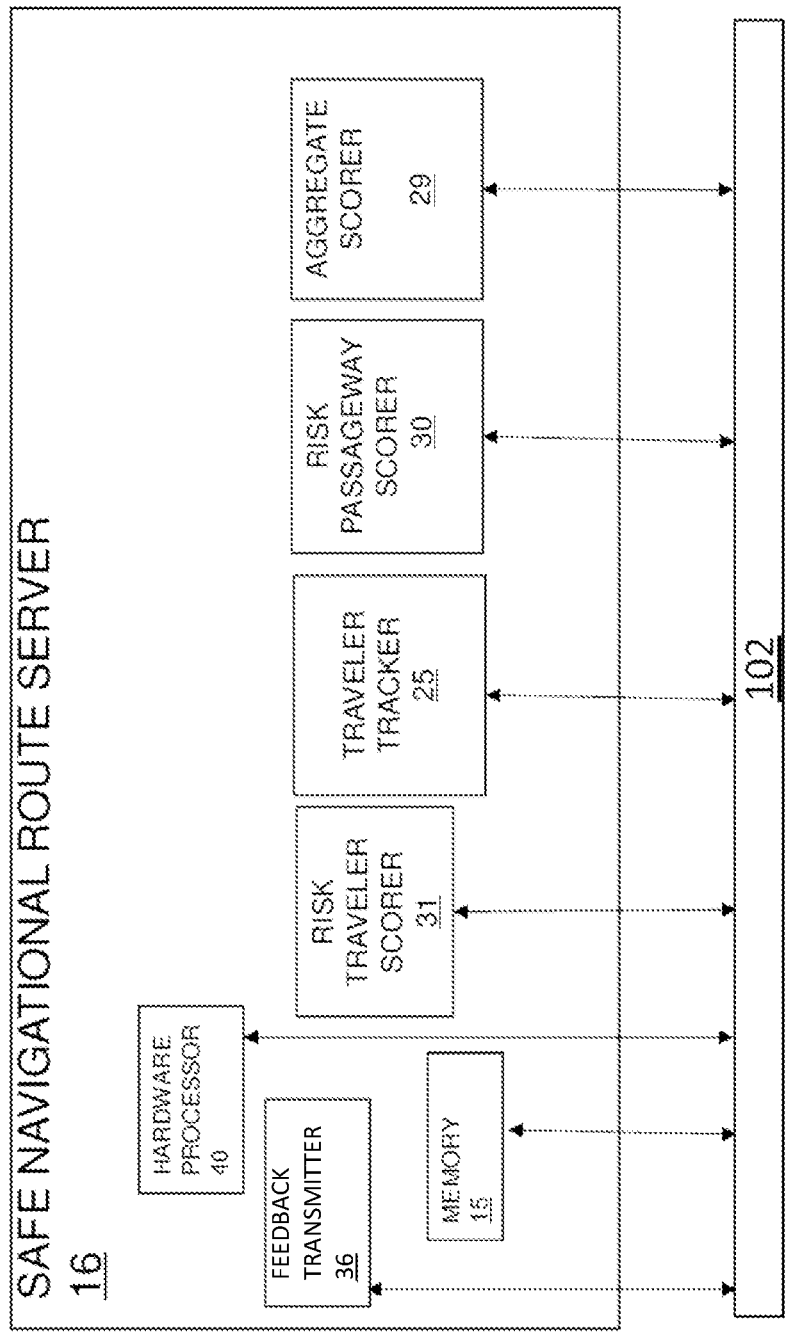
FIG. 3 is a block diagram of a safety navigational route server that calculates a safest navigation route by considering manual driver risk, in accordance with one embodiment of the present disclosure.

Referring to FIG. 1, the method can continue with ranking the at least two sets of directions by a baseline safety value at block 3. As noted above, the multiple routes 10a, 10b calculated by the navigation module 23 may be an input to the safe navigation route server 16. For example, the safe navigation route server 16 may receive the input at the route rank scorer 31 input. FIG. 3 is a diagram of a safety navigational route server that calculates a safest navigation route by considering manual driver risk.

The risk passageway scorer 30 sets a baseline safety value for each of the at least two sets of directions of travel that have been calculated by a GPS system. The risk passageway scorer 30 compiles all the data along the predefined routes 10a, 10b including all other autonomous and other human drivers nearby. The baseline safety value is a defined baseline, which can be effective for automobile and mapping modeling tools already exist that derive a known baseline of behavior for what the roadway or environment should be. However, this does not account for other human drivers, traffic patterns (associated with each unique human driver themselves), outside factors, external events, weather, etc.

In some embodiments, the destination acquired and multiple routes are calculated (known art—e.g. basic GPS navigation input and routing); and the system acquires, e.g., the risk passageway scorer 30, other external factor data from available sources, e.g. aggregated routing data of other vehicles, data on anticipated drivers on same route segments (based upon aggregated and shared GPS route plan data), reported road conditions, and combinations thereof. This stage of the process is intended to determine the safety of each route. By determining a safety value for each route, the system can then use that baseline to measure safety impact from an external matter, such as the conduct of drivers on the passageway. In some embodiments, the data obtained from the external data sources includes: weather data; traffic data; and road construction data. In embodiments, the data obtained from the external data sources also includes: driving route data of other vehicles (e.g., other than vehicle 15) and driver information associated with the drivers of the other vehicles. The external data sources may comprise one or more computer systems of one or more third parties that provide such data, e.g., in accordance with agreement(s) with an enterprise that provides the services of risk passageway scorer 30. It is noted that the safety value for the road without consideration of external factors is the baseline safety value, and a baseline safety value is determined for each of the predefined routes 10a, 10b. In some embodiments, the route ranking scorer includes at least one hardware device processor 40 and memory 15 to store and execute the functions required of the risk passageway scorer 30 of the safe navigation route server 16 to assign values of risk to the difference passageways 10a, 10b.

Referring to FIG. 1, turning to blocks 4 and 5, the method can further include determining in real time the travelers 32a, 32b that are present on passageways 10a, 10b for the at least two sets of directions, e.g., the predefined routes 10a, 10b; and ranking the travelers 32a, 32b according to travel risk behavior. The measurement of the travel risk behavior is a deviation from the baseline safety value for each of the predefined routes 10a, 10b. The system is able to evaluate all human drivers that are considered external and along the predefined routes 10a, 10b. This will change dynamically as new drivers come into focus and existing drivers leave the area and are withdrawn from scope.

The system can acquire other external factor data from available sources, such as aggregated routing data of other vehicles, data on anticipated drivers on same route segments (based upon aggregated and shared GPS route plan data), and reported road conditions in evaluating the human element.

It is noted that the system is continually updating each segment of information, which can include the safety status of the predefined routes 10a, 10b and the safety status attributed to external source, e.g., human conduct on the predefined roads 10a, 10b. The system continuously updates each segments rating based upon new data, e.g. drivers anticipated to enter segment at same time, drivers exiting segments, etc. Updates may be called for by the update module having reference number 28. The update module 28 can be provided by at least one hardware processor that executes the instructions to update that are stored on at least one memory device. The frequency and duration of the updates can be based upon the data obtained from the vehicle 15 includes: current location of the vehicle 15; current speed of the vehicle 15; driving route defined by the navigation module 23 of the vehicle 15; and driver information associated with the current driver of the vehicle 15. The call for update can be executed through the navigation module 23, e.g., GPS navigation device. The call for the update is sent to the safe navigation route server 16. Receipts for updates which can include revised navigation instructions with safety considerations can be sent back from the safe navigation route server 16 to the navigation module 23, e.g., GPS navigation device, for display to the user.

Referring to FIG. 1, block 4 can include determining in real time travelers 32a, 32b that are present on passageways 10a, 10b for the at least two sets of directions. The travelers 32a, 32b are other users of the passageways 10a, 10b besides the user 20 calling for navigation directions. They can be people in vehicles, such as cars and trucks. The travelers 32a, 32b can be tracked by a travel tracker 25 of the safe navigation route server 16 that is depicted in FIG. 3. The travel tracker 25 can employ GPS tracking to determine the number of travelers 32*a*, 32*b* on each of the passageways 10*a*, 10*b*. The travel tracker 25 may include at least one transceiver for receiving GPS information on the travelers 32*a*, 32*b*. The travel track 25 further includes at least one hardware device processor 40 and memory 41 to store and execute the functions required of the travel tracker 25 of the safe navigation route server 16 to determine the number of travelers 32*a*, 32*b* on the passageways 10*a*, 10*b*, and their identities, in real time. The travelers 32*a*, 32*b* GPS information can be made available from external factor data such as aggregated and shared GPS route plan data. The travelers 32*a*, 32*b* may also be registered users of the safe navigation route server 16, as a service. As noted above, the updater module 28 of the vehicle computer 22 continuously updates each segment, i.e., passageway 10*a*, 10*b*, rating based upon new data, e.g., drivers anticipated to enter the segment at a time, drivers exiting the segment. It is noted that in some embodiments, because autonomous vehicles are considered to be safer than manually driven cars, the tracker will only track manually driven cars.

Referring to FIG. 1, block 5 can include ranking the travelers according to travel risk behavior. For block 5 of the method, the input to the safe navigation route server 16 can include collecting all data pertaining to the surrounding drivers characteristics (also referred to as surrounding travelers 3, on the potential routes 10*a*, 10*b* being analyzed. Travel risk behavior can include historical data on the travelers 32*a*, 32*b*, which can include speeding tickets, in which the greater number of tickets and the greater the infraction, the greater the assigned risk to that particular traveler. Travel risk behavior can include a propensity to drive slower, e.g., below posted speeding limits, which can be measured using GPS, and may be measured in real time. Travel risk behavior can include a propensity to fail to use signals. Travelers 32*a*, 32*b* that do not use signals are riskier than travelers 32*a*, 32*b* that do use signals, because accidents are more prevalent with drivers that do not use signals. Incidents of road rage is another indicator of high travel risk behavior. Road rage can include unsafe driving based on observed past events.

In some examples, the ranking of the travelers 32*a*, 32*b* according to travel risk behavior can be done on a risk score assignment (per human driver) basis. Risk values can be assigned to all driver characteristics, for each unique driver's past history and monitored behavior.

In some examples, the ranking of the travelers 32*a*, 32*b* according to travel risk behavior can be done on a cumulative risk aggregation basis, which is combining all risk factor together will yield a larger aggregated risk score.

In some further examples, the ranking of the travelers 32*a*, 32*b* according to travel risk behavior can be on an aggravated risk score, in which each driver will carry a defined value that can dynamically change over time as they have safer or more risky observed behaviors/incidents.

The risk score can be calculated with one of many different algorithms/functions. An example could be a basic mathematical average of a value for each identified factor (e.g. # of speeding tickets+average speed over posted speed limits) mod 100–higher the risk score, more "unsafe" the driver).

As noted above, the updater module 28 of the vehicle computer 22 continuously updates each segment, i.e., passageway 10*a*, 10*b*, rating based upon new data, e.g., drivers anticipated to enter the segment at a time, drivers exiting the segment.

Referring to FIGS. 2 and 3, the step ranking the travelers according to travel risk behavior can be executed by the risk travel scorer 31 of the safe navigation route server 16. In some embodiments, the risk travel scorer 31 includes at least one hardware device processor 40 and memory 41 to store and execute the functions required of the risk travel scorer 31 of the safe navigation route server 16 to assign values of risk to the difference passageways 10*a*, 10*b*.

In a following step, at block 6 an aggregate risk score is assigned to each passageway 10*a*, 10*b* for the at least two sets of directions for each passageway 10*a*, 10*b* specific grouping of the travels 32*a*, 32*b* having the ranked travel risk behavior to provide a safety ranked set of the at least two sets directions to the final user location.

In one example, referring to FIG. 1, the process flow to block 5 can provide a method to identify the safest route 10*a*, 10*b* against other potential route options based on human drivers presents (also referred to as travelers). In one example, the method can derive the route cumulative risk factors based upon how many manual drivers are on each route choice. It is noted that this is only one example that is suitable for the method described herein. For example, other methods may rely upon other data, such as speeding tickets, to determine high risk drivers.

Referring to FIGS. 2 and 3, block 6 of the method depicted in FIG. 1 can be executed with the aggregate scorer 29 of the safe navigation route server 16. The input can include using each route 10*a*, 10*b* derived in above method and the associated risk based on the cumulative number of manual drivers 32*a*, 32*b*. All applicable data can be collected for all the route options. The different routes 10*a*, 10*b* can then be sorted by lowest risk route to highest risk segment. In some embodiments, the aggregate scorer 29 includes at least one hardware device processor 40 and memory 41 to store and execute the functions required of the aggregate scorer 29.

Referring back to FIG. 1, the method can communicate to the vehicle 15 the selected route to the manual driver for manual vehicle operation or program the updated route for autonomous driving at block 7. In some embodiments, the method that will automatically communicate the route to the driver or autonomous vehicle. The safe navigational router server 16 may communicate with the with the vehicle over the feedback transmitter 36.

In one example, the method described with reference to FIGS. 1-3 may include that while manual driving, a preferred route 10*a*, 10*b* is identified. The autonomous vehicle identifies the location and sets the route as the preferred route based upon the above method steps. In some embodiments, the vehicle notifies the human driver of the route change via navigational awareness, if the human is driving a manually operated vehicle.

In another example, the method described with reference to FIGS. 1-3 may include the ability to dynamically change the route at any time based on cognitive recalculations of other aggregated manual drivers on the road/current route in scope. Route manipulation is the ability to seamlessly recalculate the route based upon the number of human manual drivers around the user's vehicle. In one embodiment, the method may include that while manually driving, a secondary route is identified as being "better" than the original preferred route. The Autonomous vehicle identifies the location and sets the new "changed" route as the preferred route based upon the above method steps. The vehicle notifies the human driver of the "New/changed" route change via navigational awareness, if the human is driving a manually operated vehicle. It is noted that the continuous updating of the vehicle is a repeating loop function, which could be applied iteratively over the entire journey from the starting point to the destination.

FIG. 3 depicts one embodiment of a safety navigational route server 16 that calculates a safest navigation route by considering manual driver risk. The safety navigational route server 16 includes a risk passageway scorer 30 that sets a baseline safety value for each of at least two sets of directions calculated by a GPS navigation application; a traveler tracker 25 that records an identity for travelers that are present on passageways for the at least two sets of directions; and a risk traveler scorer that sets a score for each of the travelers according to travel risk behavior. Each of these features have been described above in the description of FIGS. 1 and 2 by elements having the same reference numbers. The safety navigational route server 16 also includes an aggregate risk scorer for assigning an aggregate risk score to each passageway for the at least two sets of directions for each passageway specific grouping of the travels having the ranked travel risk behavior to provide a safety ranked set of the at least two sets directions to the final user location; and a transmitter for delivering the safety ranked set of the at least two sets directions to the user. The bus 102 interconnects a plurality of components will be described in FIG. 3.

Figure 4:
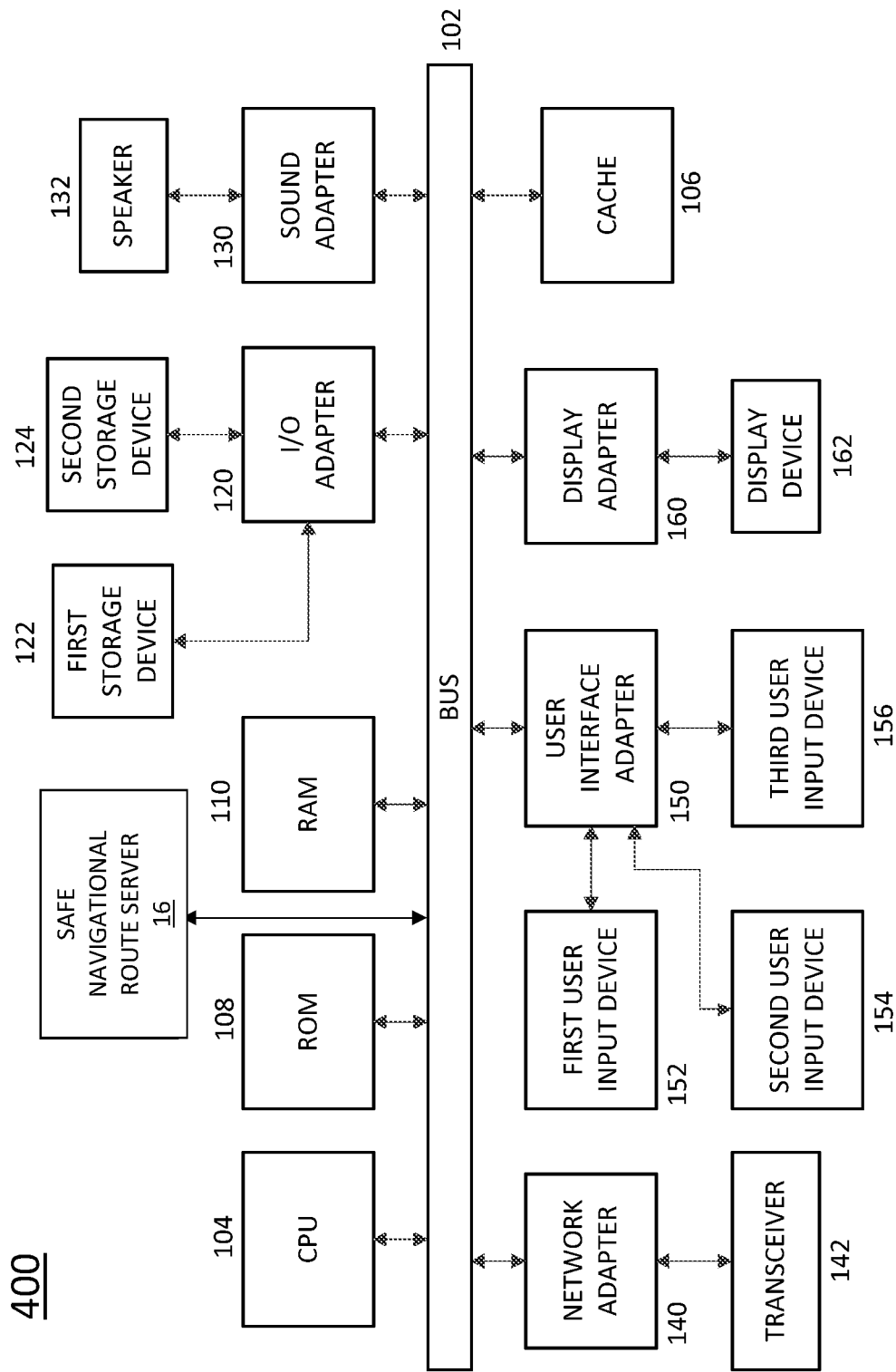
FIG. 4 is a block diagram showing a system for navigation that employs virtual maps to supplement navigation in accordance with an embodiment of the present invention.

Additionally, the safety navigational route server 16 that is depicted in FIG. 3 may be integrated into the processing system 400 depicted in FIG. 4. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 4, may further include a first storage device 122 and a second storage device 124 operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product may include a computer readable storage medium (or media) having computer readable program instructions thereon for causing a processor to carry out aspects of the present invention.

For example, the present disclosure provides a computer program product that includes a non-transitory computer readable storage medium having computer readable program code embodied therein for a method of calculating a safest navigation route by considering manual driver risk on the potential navigation routes. The method actuated by the computer program product may include providing at least two sets of directions from a user start location to a final user location; ranking the at least two sets of directions by a baseline safety value; determining in real time travelers that are present on passageways for the at least two sets of directions; ranking the travelers according to travel risk behavior; assigning an aggregate risk score to each passageway for the at least two sets of directions for each passageway specific grouping of the travels having the ranked travel risk behavior to provide a safety ranked set of the at least two sets directions to the final user location; and a safety ranked set of the at least two sets directions is delivered to the user.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings:

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 5:
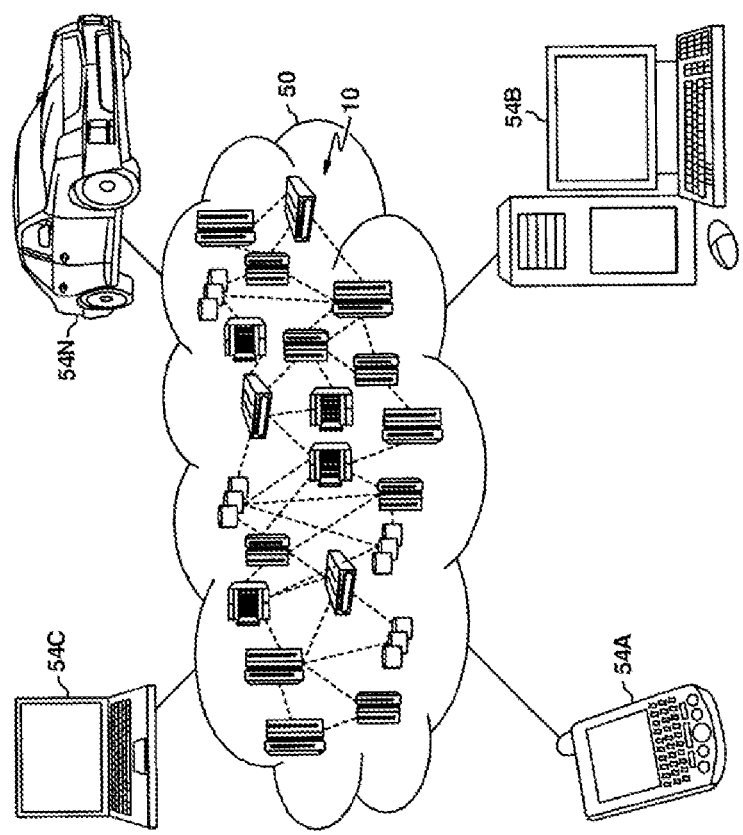
FIG. 5 is a block diagram showing an illustrative cloud computing environment having one or more cloud computing nodes with which local computing devices used by cloud consumers communicate in accordance with one embodiment.

Referring now to FIG. 5, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 51 and cloud computing environment 50 can communicate with any type of computerized device over any type of network and/or network addressable connection (e.g., using a web browser).

Figure 6:
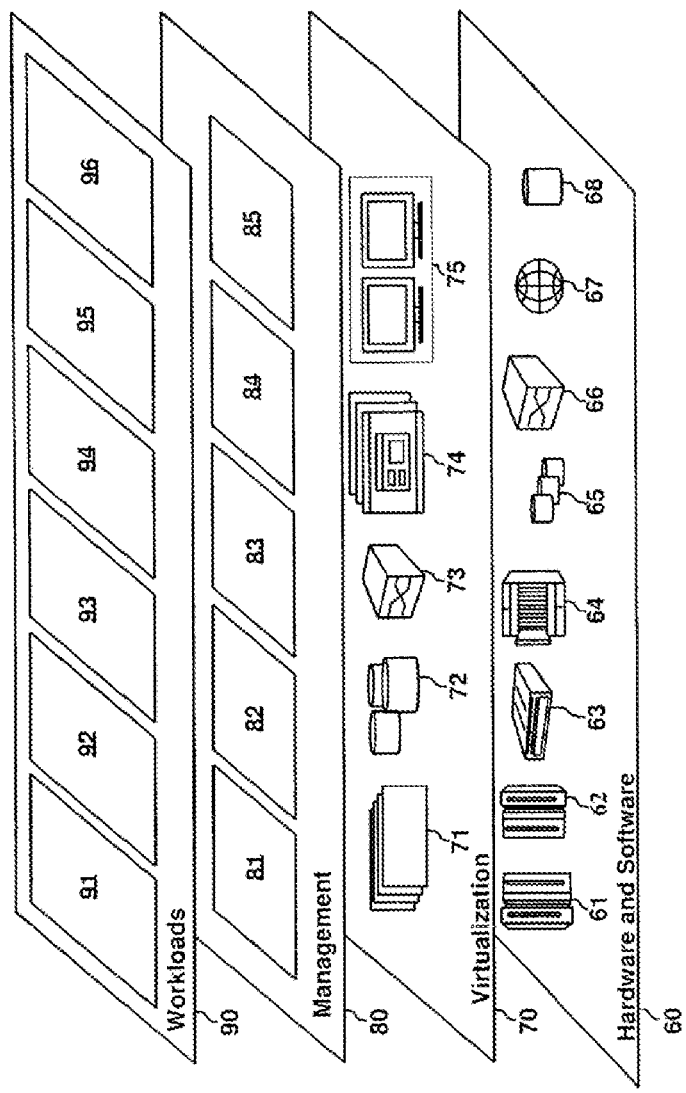
FIG. 6 is a block diagram showing a set of functional abstraction layers provided by a cloud computing environment in accordance with one embodiment.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 96 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the safe navigational route server 16, which is described with reference to FIGS. 1-11.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a method to determine the safest route for manual or autonomous mode by cognitive analysis of other manual mode drivers (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented navigation method that provides a safest route by considering manual driver risk comprising:
providing at least two sets of directions from a user start location to a final user location;
ranking said at least two sets of directions by a baseline safety value;
determining in real time travelers that are present on passageways for the at least two sets of directions;
ranking the travelers according to travel risk behavior, wherein said ranking the travelers according to travel risk behavior comprises scoring the travelers with safety criteria selected from the group consisting of speeding tickets assigned to said travelers, propensity for said travelers to drive above speed limit, propensity for said travelers to drive below speed limit, propensity of said travelers not to use signals, propensity of drivers to participate in road rage, and combinations thereof;
assigning an aggregate risk score to each passageway for the at least two sets of directions for each passageway specific grouping of the travels having the ranked travel risk behavior to provide a safety ranked set of the at least two sets directions to the final user location;
delivering the safety ranked set of the at least two sets directions to a navigation display viewed by the user; and
driving the user with an autonomous vehicle that is navigated by one of the at least two sets of directions that is selected by the user from the navigation display.

2. The computer implemented navigation method of claim 1, comprising receiving permission from the user to register the user with a navigation application that provides the at least two sets of directions, wherein the navigation application provides the user with an option to opt-in or opt-out of user data sharing with the navigation application.

3. The computer implemented navigation method of claim 1, wherein the user is a passenger in the autonomous vehicle that drives to the final user location using a highest safety ranked set of directions from the safety ranked set of the at least two sets directions to the user.

4. The computer implemented navigation method of claim 1, wherein the safety ranked set of the at least two sets directions to the user continuously updates for changes of the travelers leaving and entering the passageways for the at least two sets of directions.

5. The computer implemented navigation method of claim 1, wherein said providing at least two sets of directions from the user start location to the final user location comprises a global positioning system (GPS) navigation system.

6. The computer implemented navigation method of claim 1, wherein the ranking of said at least two sets of directions by the baseline safety value determined from variables selected from the group consisting of traffic patterns, road geography, road condition, weather conditions and combinations thereof.

7. A system including memory for storing instructions to be executed by a processor, the system provides a safest navigation route by considering manual driver risk, the system comprising:

a route ranking scorer including scoring instructions stored on the memory and executed by the processor that sets a baseline safety value for each of at least two sets of directions calculated by a GPS navigation application;
a traveler tracker including tracking instructions stored on the memory and executed by the processor that records an identity for travelers that are present on passageways for the at least two sets of directions;
a risk traveler scorer including scoring instructions stored on the memory and executed by the processor that sets a score for each of the travelers according to travel risk behavior, wherein said ranking the travelers according to travel risk behavior comprises scoring the travelers with safety criteria selected from the group consisting of speeding tickets assigned to said travelers, propensity for said travelers to drive above speed limit, propensity for said travelers to drive below speed limit, propensity of said travelers not to use signals, propensity of drivers to participate in road rage, and combinations thereof;
an aggregate scorer for assigning an aggregate risk score to each passageway for the at least two sets of directions for each passageway specific grouping of the travels having ranked travel risk behavior to provide a safety ranked set of the at least two sets directions to a final user location; and
a transmitter for delivering the safety ranked set of the at least two sets directions to a user, said delivering to the user including sending the ranked set of the at least two sets of directions to an autonomous vehicle driving providing transportation to the user, wherein the autonomous vehicle is navigated by one of the at least two sets of directions that is selected by the user from a navigation display of the autonomous vehicle.

8. The system of claim 7, wherein the user is a passenger in the autonomous vehicle that drives to the final user location using a highest safety ranked set of directions from the safety ranked set of the at least two sets directions to the user.

9. The system of claim 7, wherein the safety ranked set of the at least two sets directions to the user continuously updates for changes of the travelers leaving and entering the passageways for the at least two sets of directions.

10. The system of claim 7, wherein said providing at least two sets of directions from the user start location to the final user location comprises a global positioning system (GPS) navigation system.

11. The system on claim 7, wherein ranking of said at least two sets of directions by the baseline safety value determined from variables selected from the group consisting of traffic patterns, road geography, road condition, weather conditions and combinations thereof.

12. The system of claim 7, wherein determining in real time travelers that are present on passageways for the at least two sets of directions comprises GPS tracking of the travelers.

13. A computer program product comprising a non-transitory computer readable storage medium having computer readable program code embodied therein for a method of calculating a safest navigation route by considering manual driver risk on the potential navigation routes, the method actuated by the computer program product may include:
providing at least two sets of directions from a user start location to a final user location;

ranking the at least two sets of directions by a baseline safety value;

determining in real time travelers that are present on passageways for the at least two sets of directions;

ranking the travelers according to travel risk behavior, wherein said ranking the travelers according to travel risk behavior comprises scoring the travelers with safety criteria selected from the group consisting of speeding tickets assigned to said travelers, propensity for said travelers to drive above speed limit, propensity for said travelers to drive below speed limit, propensity of said travelers not to use signals, propensity of drivers to participate in road rage, and combinations thereof;

assigning an aggregate risk score to each passageway for the at least two sets of directions for each passageway specific grouping of the travels having the ranked travel risk behavior to provide a safety ranked set of the at least two sets directions to the final user location; and delivering a safety ranked set of the at least two sets directions to the user through a navigation display; and driving the user with an autonomous vehicle that is navigated by one of the at least two sets of directions that is selected by the user from the navigation display.

14. The computer program product of claim 13, wherein the user is a passenger in the autonomous vehicle that drives to the final user location using a highest safety ranked set of directions from the safety ranked set of the at least two sets directions to the user.

15. The computer program product of claim 13, wherein the safety ranked set of the at least two sets directions to the user continuously updates for changes of the travelers leaving and entering the passageways for the at least two sets of directions.

16. The computer program product of claim 13, wherein said providing at least two sets of directions from the user start location to the final user location comprises a global positioning system (GPS) navigation system.

17. The computer program product of claim 13, wherein the ranking of said at least two sets of directions by the baseline safety value determined from variables selected from the group consisting of traffic patterns, road geography, road condition, weather conditions and combinations thereof.

18. The computer program product of claim 13, wherein determining in real time travelers that are present on passageways for the at least two sets of directions comprises GPS tracking of the travelers.

* * * * *